C. L. MERITHEW.
COLD STORAGE APPARATUS.
APPLICATION FILED SEPT. 23, 1916.
1,280,266.
Patented Oct. 1, 1918.
3 SHEETS—SHEET 1.
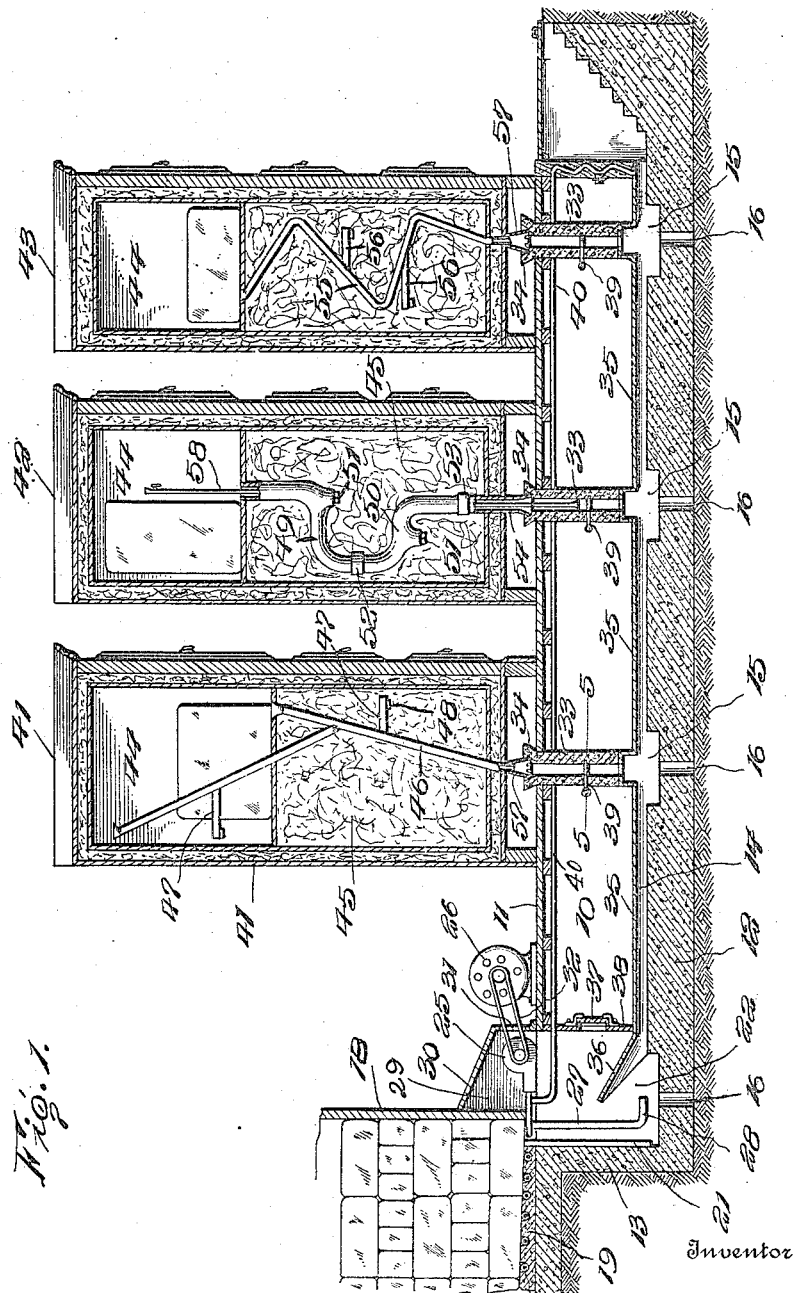
Witness
P. P. Veihmeyer.
Inventor
Charles L. Merithew
By G. Dittmar
Attorney

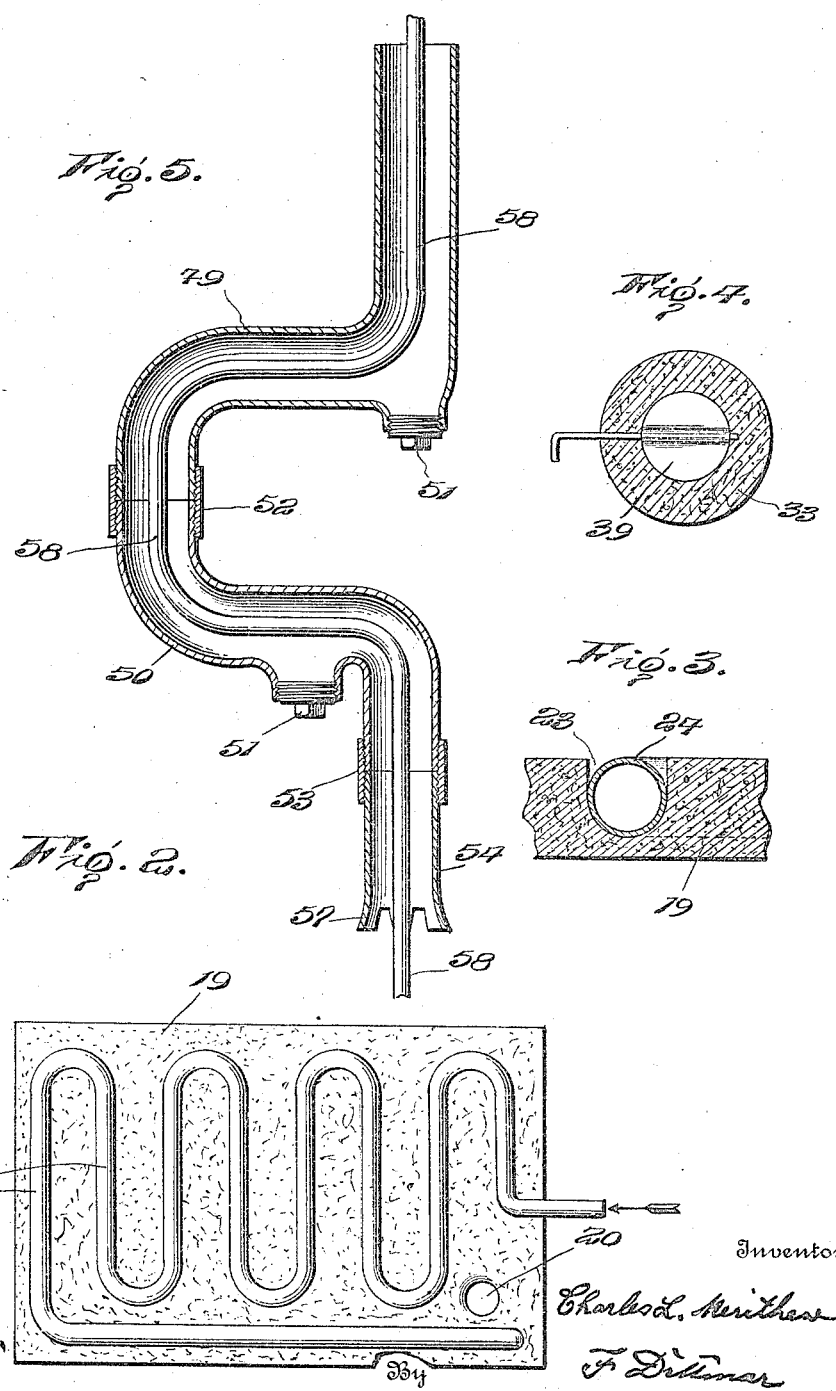

C. L. MERITHEW.
COLD STORAGE APPARATUS.
APPLICATION FILED SEPT. 23, 1916.
1,280,266.
Patented Oct. 1, 1918.
3 SHEETS—SHEET 3.
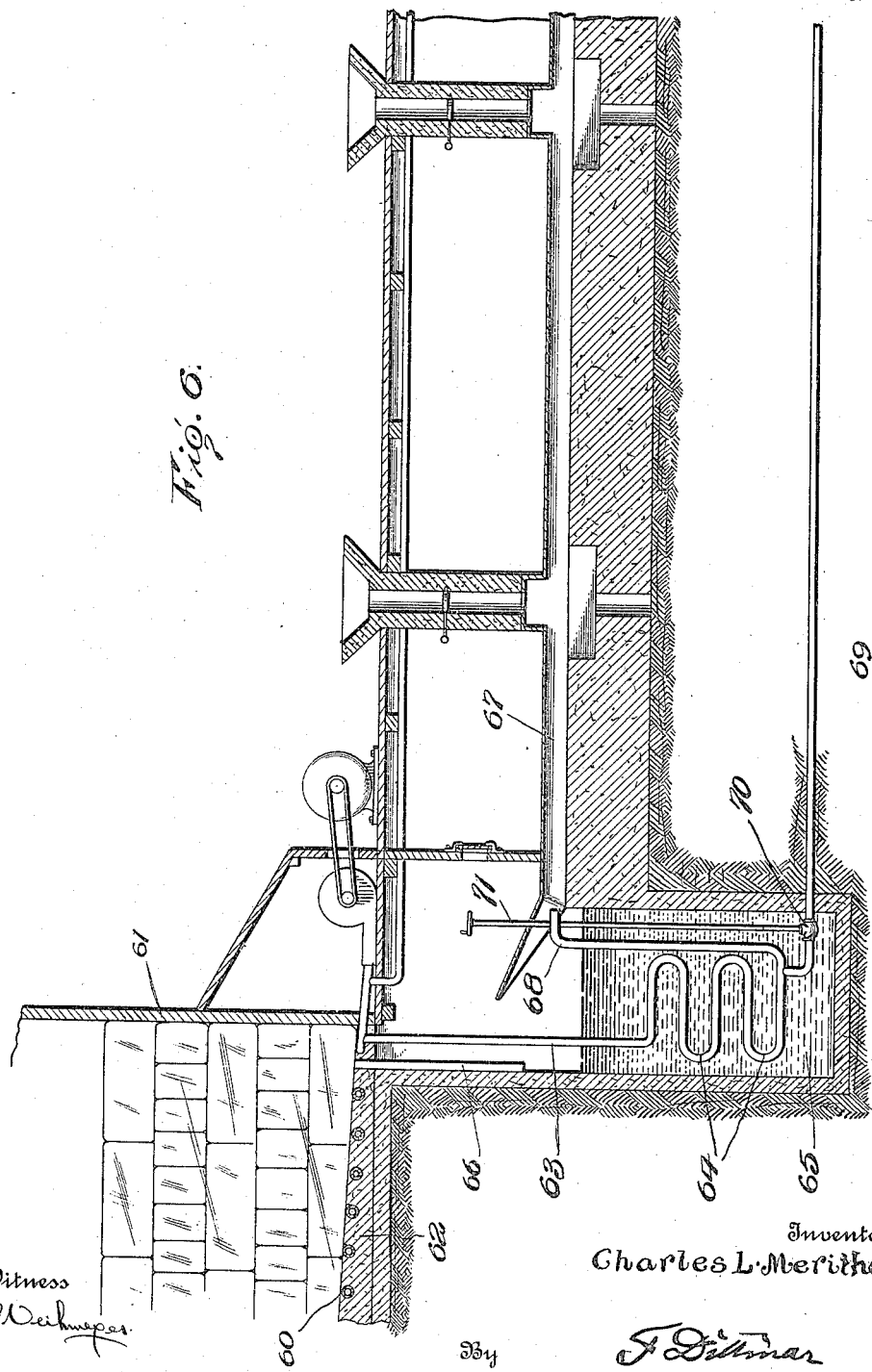
Witness
P. F. Weihmeyer
Inventor
Charles L. Merithew
By
F. Dittmar
Attorney

UNITED STATES PATENT OFFICE.

CHARLES L. MERITHEW, OF BUCKLEY, MICHIGAN.

COLD-STORAGE APPARATUS.

1,280,266.  Specification of Letters Patent.  Patented Oct. 1, 1918.

Application filed September 23, 1916.  Serial No. 121,800.

*To all whom it may concern:*

Be it known that I, CHARLES L. MERITHEW, citizen of the United States, residing at Buckley, county of Wexford, State of Michigan, have invented certain new and useful Improvements in Cold-Storage Apparatus, of which the following is a specification, reference being had therein to the accompanying drawing.

The invention relates to improvements in cold storage apparatus.

The primary object of the invention is to provide an apparatus of the character mentioned, and one which embodies extreme simplicity and efficiency in construction and operation, and which is comparatively inexpensive in cost of installation and maintenance.

Another object of the invention is to utilize, in the operation of cold storage apparatus, the ordinary waste drip water from ice storage houses, or the like, for cooling the air circulation maintained in the apparatus and which constitutes the cooling medium of the apparatus contemplated.

A further object of the invention is to provide an apparatus of the type mentioned, and one embodying a main cooled storage chamber or chambers, in conjunction with one or more auxiliary cooling chambers removable from the main cooling chamber or chambers.

A still further object of the invention is to utilize the cold drip water from the auxiliary cooling chambers in conjunction with with the main supply of cold drip water, whereby highest efficiency is secured and maintained throughout the apparatus.

With these and other objects in view the invention resides in the certain new and useful construction and arrangement as will be hereinafter more fully described, set forth in the appended claims, and illustrated in the accompanying drawings, in which, Figure 1 is a vertical longitudinal section of the preferred embodiment of the apparatus.

Fig. 2 is a top plan view of the floor of the ice storage chamber or house with the air cooling coil positioned thereon.

Fig. 3 is a fragmentary, vertical section, showing the manner of supporting the air cooling coil in detail.

Fig. 4 is a cross-sectional view of a stand- pipe leading to one of the auxiliary cooling chambers, and, Fig. 5 is a detail vertical section of the preferred form of drip and air pipe arrangement of one of the auxiliary cooling chambers.

Fig. 6 is a vertical sectional view of a modification of the invention.

Referring to the drawing, in which similar characters of reference designate corresponding parts in the several views thereof, the numeral 10 indicates a cold storage chamber, located between the ordinary floor 11 and a cement basement floor 12, of a building, the latter floor being continuous with cement foundation walls 13. Extending longitudinally of the cement floor 12 is a channel or gutter 14, which connects a series of equi-distantly spaced traps 15 the latter each having an outlet duct 16 opening through the floor 12 to the ground.

Located at one end of the building, not shown, and supported on a cement foundation wall 17 in alinement with the ordinary floor 11, of the former, is an ice storage chamber 18, which is provided with an inclined cement floor 19. The forward end of the inclined floor 19 is arranged to project beyond and overlie the adjacent foundation wall 13, and is formed with a drip discharge outlet 20 of a pipe 21, which projects downward into a well or chamber 22, formed in advance of the cooling chamber 10.

Supported on the inclined cement floor 19, of the ice chamber 18, or disposed in grooves 23, formed therein for the purpose, is a coil 24, having a connection, at one end, with an air supply 25, which may be in the form of a fan blower, driven in any suitable manner, or by means of an electric motor 26, and, at its other end with a discharge pipe 27, the latter descending into the well 22 and having an angular discharge nozzle portion 28, disposed in the plane of the channel 14, and discharging longitudinally thereof. The grooves 23 are preferably of a depth to admit of the sections of the air cooling coil 24 being positioned therein, so that their top surfaces are within the plane of the inclined surface of the floor 19 to prevent the possibility of their being injured by the ice, when the same is being placed in position within the ice chamber or house.

The fan blower 25 is inclosed by a housing 29, which is provided with a cover 30, and an opening 31 through which is passed the drive belt 32, connecting the blower to the motor.

Rising vertically of the cooling chamber 10, and corresponding in number to that of the traps 15, are a plurality of cement stand-pipes 33 which project through the floor 11, and each terminates in a flared portion 34, the purpose of which will be hereinafter described. Extending the length of the channel 14, and inclosing the same, are one or more cover sections 35, so as to provide a duct for leading the cooled air to the stand-pipes 33. The forward end 36 of the cover section 35, is inclined upward, as shown, to direct a portion of the cool air into the upper part of the well 22, where it may be admitted to the cold storage chamber 10 through a valve 37 provided for the purpose in a partition wall 38, which separates the well from said cold storage chamber. The stand-pipes 33 may be provided with valves 39 for the purpose of cutting off the air passing through the channel 14.

A pipe 40 connects the fan blower 25 to the rear of the channel 14, whereby the warmer air collecting at this point may be withdrawn and passed again into the coil 24.

In addition to the foregoing construction, the invention contemplates the use of one or more refrigerator units 41, 42 and 43, of which there may be a number of such units to correspond to the number of stand-pipes 33, each being positioned over one of the latter, and having the lower end of their drip pipes supported within the flared portion 34 thereof.

These refrigerator units may be of the ordinary or usual construction, but are preferably of the construction as set forth in Letters-Patent No. 1,209,471, and dated December 19, 1916, in which case they comprise an upper ice chamber 44, and a pair of storage compartments (not shown), the latter being separated by a partition wall 45. Extending upward within the partition wall 45, of the unit 41, is a drip pipe 46 which opens through the bottom wall of the ice chamber 44, and inclines downwardly therefrom and projects through the bottom wall of the refrigerator. The drip pipe 46 is provided with traps 47 adapted to receive the drip water and retain any and all sediment, which may be removed through the usual capped outlets 48, when necessary or desired.

In the unit 42, the drip pipe comprises two elbow sections 49 and 50, each provided with a capped outlet 51, and are connected together by means of a union 52, the lower section 50 being further connected, by means of a union 53 to a discharge section 54, which is passed through the bottom wall of the refrigerator and is supported in the flared portion 34 of a stand-pipe.

In the unit 43, the drip pipe 55 is angularly bent to provide a tortuous passage, and is also provided with soil traps 56, similar to those of the unit 41.

In the units 41 and 43, air passes upward through the drip pipes 46 and 55 in direct contact with the drip water, which is discharged into the stand-pipes 33, and into the traps 15 at the bottom of the latter. The air, to be admitted to the refrigerator units may be taken direct from the channel 14, entirely, or the lower portions of the drip pipes may be provided with flared ends 57 formed with openings so as to admit the cool air circulating beneath the refrigerator units.

In the unit 42, however, the air to be admitted to the same is passed through a pipe 58 extending upward of the drip pipe, as shown, and discharges from the same into the ice chamber.

In the operation of the apparatus with the ice-chamber or house 18 filled with the main ice supply, and the fan blower 25 being driven by the electric motor, air is forced through the cooling coil 19 and is discharged into the well 22, where it is admitted to the cold storage chamber 10 through the valve 37 in the partition 38. The cold drip water, from the main ice chamber or house, is discharged into the well 22 and flows through the longitudinal channel 14 and fills the several traps 15, thereof. The drip water from the refrigerators 41, 42 and 43 discharges through the stand-pipes 33 and empties into the respective traps thereof. The flow of this drip water, however, may be checked by the valves 39, so that its cooling effect is transmitted to the cooling chamber 10, through the cement walls of the stand-pipes. A free and continuous circulation of the cold air is maintained throughout the storage apparatus by means of the return pipe 40. A portion of the air circulation is also maintained through the channel in contact with the drip water from the main ice chamber, as well as that from the several refrigerators, so that the entire cooling effect of the latter is utilized.

In the modified form of the invention, as shown in Fig. 6, the air cooling coil 60, located in the inclined floor 62, of the ice house 61, is provided with a depending discharge pipe 63, which is continuous with or connects to a second air cooling coil 64 supported within the lower portion of a relatively deep well 65, the latter having its walls formed of cement and continuous with the foundation walls of the entire apparatus. In this arrangement, drip water from the ice house 61 is discharged into the well 65 from a pipe 66, and fills the well to the level of the channel 67, so that the coil 64 is completely immersed at all times, and the cool air from the latter is discharged from the outlet pipe 68, immediately above the water level and adjacent the entrance to said channel. In this form of the invention, it is also contemplated to utilize a portion of the cold air, after passing through the coils 60 and 64, at a distance, and for this purpose a branch pipe 69 is connected with the coil 64, and is provided with a valve 70, which is operable by means of a rod 71 extending upward to a convenient point for its manipulation.

It is to be understood that various changes in the detailed construction and arrangement may be resorted to without departing from the spirit and scope of the invention.

Having thus fully described the invention, what is claimed, is:—

1. In a cold storage apparatus, a main ice storage chamber, a cold storage chamber, means for maintaining an air circulation through said cold storage chamber, a plurality of auxiliary ice storage chambers, means for directing cold air from beneath said chambers into the auxiliary ice storage chambers, and means for utilizing the cold drip water from said main ice chamber and said auxiliary ice chambers for cooling the air circulation of said apparatus.

2. In an apparatus of the class described, a cold storage chamber, a channel beneath the same with outlet ducts therefrom, a well in communication with said channel, an ice storage chamber with a drip pipe extending into said well, an air supply device having a discharge pipe extending into said well to direct air longitudinally of said channel, means for directing a portion of the cool air into the upper part of said well, and a plurality of upright pipes extending through the cold storage chamber and communicating with said channel.

3. In an apparatus of the class described, a cold storage chamber, a channel beneath the same with outlet ducts therefrom, a well at one end of said chamber and in communication with said channel, an ice storage chamber with a drip pipe extending into said well, an air supply device having a discharge pipe extending into said well and having an angular discharge nozzle for directing the air longitudinally of said channel, a cover section over said channel and having an upwardly-inclined end within said well, and a plurality of upright pipes extended through the cold storage chamber and communicating with said channel.

4. In an apparatus of the class described, a cold storage chamber, a channel beneath the same with outlet ducts therefrom, a well at one end of said chamber and in communication with said channel, an ice storage chamber with a drip pipe extending into said well, an air supply device having a discharge pipe extending into said well and having an angular discharge nozzle for directing the air longitudinally of said channel, a cover section over said channel and having an upwardly-inclined end within said well, a plurality of upright pipes extended through the cold storage chamber and communicating with said channel, and valves in said pipes, the upper ends of said pipes having flared ends.

In testimony whereof I affix my signature in the presence of two witnesses.

CHARLES L. MERITHEW.

Witnesses:
J. WARNER BROWN,
MABLE EDGETT.